US008365251B2

(12) United States Patent
Yamaguchi

(10) Patent No.: US 8,365,251 B2
(45) Date of Patent: Jan. 29, 2013

(54) USER MANAGEMENT SYSTEM, USER MANAGEMENT METHOD, INFORMATION RECORDING MEDIUM AND USER MANAGEMENT PROGRAM

(75) Inventor: Takeshi Yamaguchi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 331 days.

(21) Appl. No.: 12/738,241

(22) PCT Filed: Oct. 15, 2008

(86) PCT No.: PCT/JP2008/068684
§ 371 (c)(1),
(2), (4) Date: Apr. 15, 2010

(87) PCT Pub. No.: WO2009/051146
PCT Pub. Date: Apr. 23, 2009

(65) Prior Publication Data
US 2010/0211994 A1  Aug. 19, 2010

(30) Foreign Application Priority Data
Oct. 19, 2007  (JP) .................................. 2007-272756

(51) Int. Cl.
*H04L 29/06* (2006.01)
(52) U.S. Cl. ............................................. 726/3; 726/27
(58) Field of Classification Search .................. 726/3, 27
See application file for complete search history.

(56) References Cited

U.S. PATENT DOCUMENTS
(Continued)

FOREIGN PATENT DOCUMENTS
JP   2003-258913    9/2003
JP   2004-220401    8/2004
(Continued)

OTHER PUBLICATIONS

Taiwanese Office Action with English Translation (Issued Nov. 23, 2011).

(Continued)

*Primary Examiner* — David García Cervetti
(74) *Attorney, Agent, or Firm* — Howard & Howard Attorneys PLLC

(57) ABSTRACT

In order to properly transmit a notification of prompting a user who has not logged in a network communication game or an SNS for a long time to that user, a terminal device (251) of a user management system (201) stores a friend user name, a login user name and a friend user name are reported to a management server device (231) at the time of login, the management server device (231) manages a report received at last for each transmission originator user name in association with a login time. When a login user name is specified as a friend user name in a past report of a friend user name specified in a new report, a login time of the friend user of the new report is notified to the terminal device (251), and when a difference between the login time of the friend user and a current time exceeds a predetermined threshold period, the terminal device (251) transmits an electronic mail of prompting the friend user to log in to a mail address of the friend user managed by the terminal device (251).

8 Claims, 5 Drawing Sheets

U.S. PATENT DOCUMENTS

| | | | |
|---|---|---|---|
| 6,677,968 B1 * | 1/2004 | Appelman | 715/853 |
| 7,311,608 B1 * | 12/2007 | Danieli et al. | 463/42 |
| 2008/0215547 A1 * | 9/2008 | Matsumoto et al. | 707/3 |

FOREIGN PATENT DOCUMENTS

| | | |
|---|---|---|
| JP | 2005-018263 | 1/2005 |
| JP | 2005-202941 | 7/2005 |
| JP | 2006-202196 | 8/2006 |
| JP | 2007-068656 | 3/2007 |
| JP | 2007-179330 | 7/2007 |
| TW | 200639651 A | 11/2006 |

OTHER PUBLICATIONS

International Search Report of Jan. 6, 2009 for PCT Application No. PCT/JP2008/068684, 2 pages.

* cited by examiner

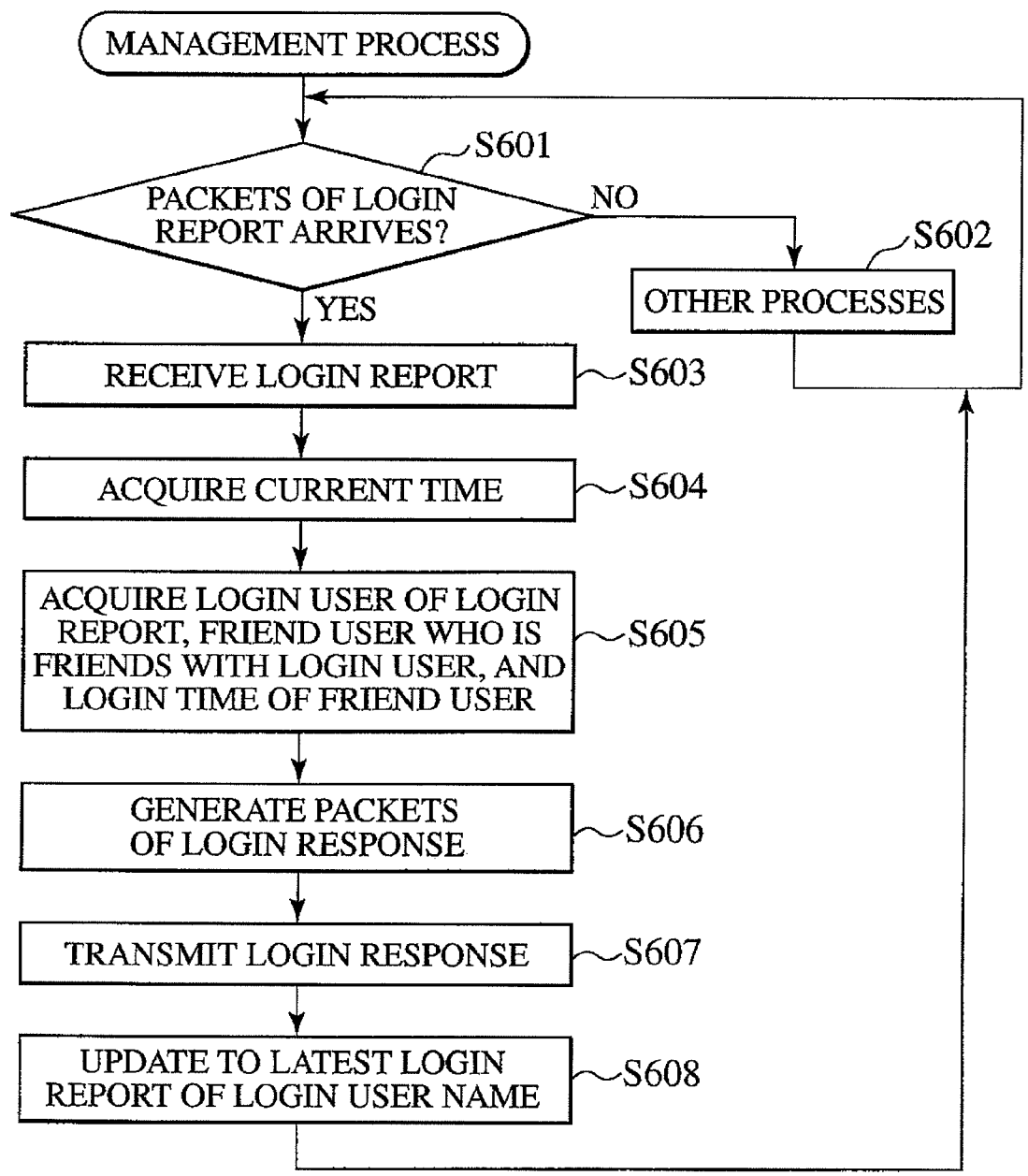

USER MANAGEMENT SYSTEM, USER MANAGEMENT METHOD, INFORMATION RECORDING MEDIUM AND USER MANAGEMENT PROGRAM

TECHNICAL FIELD

The present invention relates to a user management system and a user management method which are appropriate for properly transmitting a notification of prompting a user who has not been logging in a network communication game, an SNS (Social Network Service) or the like for a long time to log in, a computer-readable information recording medium recording a program which allows a management server and a plurality of terminal devices to realize such a system and a method, and the program.

BACKGROUND ART

Conventionally, in network communication games, users form a party to take an activity in some cases, so that a friendship that users can trust one another is formed. In SNS, a friendship is used in order to impose a restriction of allowing only a user who has a certain level of trust relationship to view diaries or photos. A technology relating to such a friendship is disclosed in a literature to be listed later.

In patent literature 1 to be listed later, when a user (hereinafter, "friend user") who is specified as a friend by another user (hereinafter, "login user") plays a game through a terminal device, a play result is transmitted to a server, and when the login user attempts to play the game through the terminal device, the server transmits the play result of the friend user to the login user, so that the users can figure out the play statuses of friends each other.

Patent Literature 1: Unexamined Japanese Patent Application KOKAI Publication No. 2007-068656

DISCLOSURE OF INVENTION

Problem to be Solved by the Invention

However, if a friend user has not been logging in, the login user may loose an interest to a network communication game or an SNS. Accordingly, there is a strong demand for a technology of prompting such a user to log in.

Conversely, if a notification of prompting a user to log in is transmitted through a system other than the network communication game or the SNS, when the user has not been using that system, no notification is transmitted to the user who has not been logging in. Accordingly, it is necessary to cope with such circumstance.

Moreover, it is desirable that a user manages his/her own personal information by himself/herself. In recent days that protection of personal information is strongly recognized, there is a demand of transmitting a notification of prompting another user to log in without letting a manager of the server know the personal information of the user.

The present invention has been made to overcome the foregoing problems, and it is an object of the present invention to provide a user management system and a user management method which are appropriate for properly transmitting a notification of prompting a user who has not been logging in a network communication game, an SNS (Social Network Service) or the like for a long time to log in, a computer-readable information recording medium recording a program which allows a management server and a plurality of terminal devices to realize such a system and a method, and the program.

Means for Solving the Problem

To achieve the object, there is provided a following species of invention based on the principle of the present invention.

A user management system according to one aspect of the present invention comprises a management server device and a plurality of terminal devices, and configured as follows.

That is, the management server device includes a server memory unit, a login report receiving unit, an acquiring unit, a login response transmitting unit, and a server updating unit. In contrast, each of the plurality of terminal devices includes a terminal memory unit, a login report transmitting unit, a login response receiving unit, an extracting unit, and a mail transmitting unit.

(a) Each of the plurality of terminal devices stores a user name of a user (hereinafter, a "login user") using a local terminal device in the terminal memory unit, and also stores a user name of a user (hereinafter, a "friend user") who is a friend of the login user and a mail address of the friend user in the terminal memory unit in association with each other.

When the terminal device is realized by a game terminal, such information are stored in a memory card or the like saving a status of a game. When the terminal device is realized by an ordinary computer, such information are stored in a hard disk drive or the like. The user name of the friend user is information managed by the user management system, but it is typical that the mail address of the friend user is directly transmitted from the friend user, and is not managed by the management, server device. A final login time is appropriately notified from the management server device as will be explained later.

The login report transmitting unit transmits a login report, specifying the user name of the login user and the user name of the friend user stored in the terminal memory unit, to the management server device.

It is typical that a trigger when the login report transmitting unit transmits a login report to the management server device is when the terminal device initiates a process, e.g., when a user starts utilizing a network communication game to which the user management system of the present invention is applied, through the terminal device, or when the user logs in an SNS from a cellular phone or a computer through a browser or an exclusive software.

In the management server device, the login report receiving unit receives a login report transmitted from each of the plurality of terminal devices, and the server memory unit stores a login report in association with a login time.

A login report is information transmitted from each terminal device at the time of login. It is fine if information transmitted from the terminal device at the time of login is reproduced, so that necessary information may be sorted appropriately and stored, not directly storing the packets of a login report as it is. A login time may be a start time of a process measured by the terminal device, or may be a time when a login report arrives the management server device.

Conversely, the acquiring unit selects a login report stored in association with a latest login time for each login user name specified in each login report stored in the server memory unit, and acquires a user name of a login user specified in, among the selected login reports, a login report satisfying a predetermined friend condition relative to the received login report together with a login time stored in association with that login report.

As a matter of logic, login reports specifying user names as login user names are sorted in the order of a login time for each user, a login report having a latest login time is acquired, and it is determined whether or not the login report satisfies a friend condition relative to the received login report.

Note that a condition that one login report satisfying a predetermined friend condition relative to another login report is a case in which:

(1) a user name of a friend user specified in another login report is specified as a user name of a login user in the one login report; and (2) a user name of a login user specified in another login report is specified as a user name of a friend user in the one login report.

As explained above, a login report specifies a user name of a friend user whom the login user confirms that such friend user is a friend. That is, as the foregoing conditions (1) and (2) are satisfied, a user name who confirms that he/she is a friend with the login user who has transmitted the received login report is acquired. Moreover, when one user is no longer confirming that another user is a friend even though both users were used to be friends with each other, it does not mean that both users confirm that both of them are friends with each other.

The login response transmitting unit transmits a login response, specifying the acquired user name and login time as a user name of a friend user and a login time of the friend user, respectively, to the terminal device which has transmitted the received login report.

A final login time may be a sort of personal information, but it is configured that the final login times of respective friend users who confirm that they are friends with each other can be acquired at the terminal device side through this process based on an assumption that it is fine to let those users who confirm that they are friends with each other to know such information.

The server updating unit stores the received login report in the server memory unit in association with a login time which is a current time.

As explained above, only a latest login report specifying a specific user as a login user is acquired by the acquiring unit from the server memory unit.

Accordingly, older login reports may be completely deleted from a database. In this case, the acquiring unit may perform determination of the friend condition after all login reports having a login user name different from the received login report are selected.

Accordingly, if a "login report at a latest login time for each friend user satisfying the conditions (1) and (2)" is adopted as a search condition at the acquiring unit, the process at the server updating unit becomes sufficient by merely acquiring a current time and registering the acquired current time in association with the received login report in a database.

(c) In each of the plurality of terminal devices, the login response receiving unit receives a login response transmitted from the management server device.

As explained above, the login response specifies a final login time of a friend user who is confirmed as a friend with a user using the local terminal device with each other.

The extracting unit extracts, among user names of friend users specified in the received login response, a user name of a friend user, having a difference between a current time and a login time of the friend user specified in the received login response, the difference exceeding a predetermined threshold period.

The predetermined threshold period is several times of a desirable login interval in a network communication game or an SNS, and is typically one to several weeks.

Conversely, the mail transmitting unit transmits an electronic mail of prompting the friend user to log in to a mail address stored in the terminal memory unit in association with the user name of the extracted friend user.

As explained above, mail addresses stored in the terminal memory unit are typically exchanged between users with each other. According to the present invention, as the terminal device directly (more specifically, through various mail servers (it is typical that a device other than the management server device is selected, but the management server device may be used) in relay) transmits a mail, linking between a user name and a mail address at the management server device becomes unnecessary. Moreover, as the mail address itself is managed at the terminal device side, it is preferable in many cases from the standpoint of management of personal information.

According to the present invention, a notification of prompting a user to log in is automatically performed through a mail address which is not directly managed by the user management system, so that the user is attracted to a network communication game or an SNS utilizing the user management system, while at the same time, management of a mail address is entrusted to each user, so that there is an advantage for protection of personal information.

Moreover, each of the plurality of terminal devices may further comprises a terminal updating unit which deletes a user name of a friend user having no login time specified in the received login response and a mail address of the friend user from the terminal memory unit.

If a login response does not specify a login time, it represents a situation that "users no longer confirm that both of them are friends with each other", so that a mail address which is personal information of the "friend user no longer a friend any more" is deleted from the terminal memory unit. Note that at the time of deletion, information on the "friend user no longer a friend any more" may be present on a screen, and a login user may be asked and confirmed whether or not to delete such information.

According to the present invention, as a friendship between users is properly managed between terminals, when such a friendship is broken because of some reason, information stored in the terminal device can reflect such break appropriately.

In each of the plurality of terminal devices in the user management system of the present invention, the terminal memory unit may store a user name of a friend user in association with a final login time of the friend user, and the terminal updating unit may update a final login time stored in the terminal memory unit in association with a user name of a friend user specified in the received login response with a login time specified in the received login response.

A final login time of each friend user is thus updated through this process, and for example, as a menu item for checking a current status of each friend user is executed, the final login time is utilized for displaying or the like.

According to the present invention, it becomes possible to appropriately manage information on a final login time of a friend user at the terminal device.

Each of the plurality of terminal devices in the user management system of the present invention may further comprise a mail editing unit which presents a template of an electronic mail of prompting a user to log in to the login user, and allows the login user to edit the electronic mail, and the mail transmitting unit may transmit an edited electronic mail.

That is, a message from a user can be specified in a login prompting mail, not automatically transmitting a stylized login prompting mail.

According to the present invention, a message created by a user enhances a friendship between users, thereby prompting a user to log in.

In each of the plurality of terminal devices in the user management system of the present invention, the terminal memory unit may further store a mail server name to be used by the login user, and the mail transmitting unit may transmit an electronic mail via a mail server with the stored mail server name.

As explained above, according to the present invention, notification of prompting a user to log in is performed through an electronic mail, but it is desirable that such electronic mail should utilize a device other than the management server device as a mail server from the standpoint of personal information protection and avoiding any increasing of the number of accesses. In order to cope with such a circumstance, it is configured that a mail server to be used can be selected at the terminal device side.

According to the present invention, it is possible to cope with a circumstance in which a device other than the management server device is desirable to use as a mail server from the standpoint of personal information protection and from the standpoint of avoiding any increasing of the number of accesses.

A user management method according to another aspect of the present invention is executed by a management server device and a plurality of terminal devices, wherein the management server device comprises a server memory unit, a login report receiving unit, an acquiring unit, a login response transmitting unit, and a server updating unit, and each of the plurality of terminal devices comprises a terminal memory unit, a login report transmitting unit, a login response receiving unit, an extracting unit, and a mail transmitting unit. The method includes a login report receiving step, an acquiring step, a login response transmitting step, and a server updating step all executed at the management server device, and a login report transmitting step, a login response receiving step, an extracting step, and a mail transmitting step all executed at each of the plurality of terminal devices, and configured as follows.

(a) Each of the plurality of terminal devices stores a user name of a user (hereinafter, a "login user") using the local terminal device in the terminal memory unit, and also stores a user name of a user (hereinafter, a "friend user") who is a friend of the login user in the terminal memory unit in association with a mail address.

The login report transmitting step causes the login report transmitting unit to transmit a login report specifying a user name of the login user and a user name of a friend user stored in the terminal memory unit to the management server device.

(b) The management server device stores a login report in the server memory unit in association with a login time.

The login report receiving step causes the login report receiving unit to receive a login report transmitted from each of the plurality of terminal devices.

The acquiring step causes the acquiring unit to select a login report stored in association with a latest login time for each login user name specified in each login report stored in the server memory unit, and to acquire a user name of a login user specified in, among the selected login reports, a login report satisfying a predetermined friend condition relative to the received login report together with a login time stored in association with that login report.

Note that a condition that one login report satisfying a predetermined friend condition relative to another login report is a case in which:

(1) a user name of a friend user specified in another login report is specified as a user name of a login user in the one login report; and (2) a user name of a login user specified in another login report is specified as a user name of a friend user in the one login report.

The login response transmitting step causes the login response transmitting unit to transmit a login response, specifying the acquired user name and login time as a user name of a friend user and a login time of the friend user, respectively, to the terminal device which has transmitted the received login report.

On the other hand, the server updating step causes the server updating unit to store the received login report in the server memory unit in association with a login time which is a current time.

(c) At each of the plurality of terminal devices, the login response receiving step causes the login response receiving unit to receive a login response transmitted from the management server device.

The extracting step causes the extracting unit to extract, among user names of friend users specified in the received login response, a user name of a friend user, having a difference between a current time and a login time of the friend user specified in the received login response, the difference exceeding a predetermined threshold period.

Furthermore, the mail transmitting step causes the mail transmitting unit to transmit an electronic mail of prompting the friend user to log in to a mail address stored in the terminal memory unit in association with the user name of the extracted friend user.

A program according to the other aspect of the present invention includes a management server device program and a terminal device program, the management server device program allows a computer for a management server device to function as the foregoing management server device, and the terminal device program allows a computer of each of the plurality of terminal devices to function as the foregoing terminal device.

The program of the present invention can be recorded in a computer-readable information memory medium, such as a compact disc, a flexible disc, a hard disk, a magneto-optical disk, a digital video disk, a magnetic tape, or a semiconductor memory.

The foregoing program can be distributed and sold independently from a computer which executes the program through a computer communication network. Moreover, the foregoing information memory medium can be distributed and sold independently from the computer.

Effect of the Invention

According to the present invention, there are provided a user management system and a user management method which are appropriate for properly transmitting a notification of prompting a user who has not been logging in a network communication game, an SNS (Social Network Service) or the like for a long time to log in, a computer-readable information recording medium recording a program which allows a management server and a plurality of terminal devices to realize such a system and a method, and the program.

BRIEF DESCRIPTION OF DRAWINGS

FIG. 6 is a flowchart showing a flow of a control for a management process executed by the management server of the embodiment.

DESCRIPTION OF REFERENCE NUMERALS

Figure 1:
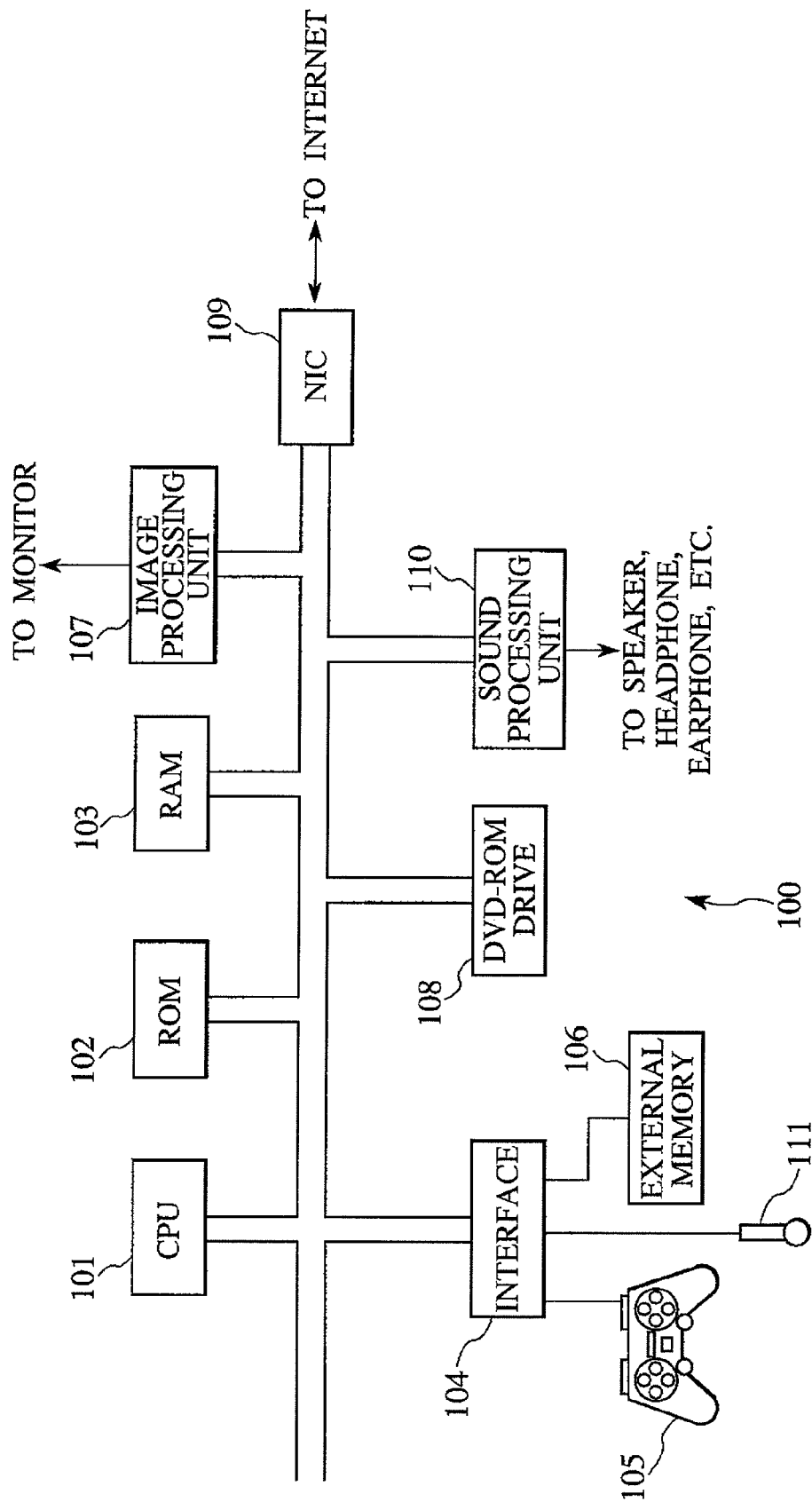
FIG. 1 is an exemplary diagram showing a general configuration of a typical information processing device which functions as a terminal device or the like of the present invention.

100 Information processing device
101 CPU
102 ROM
103 RAM
104 Interface
105 Controller
106 External memory
107 Image processing unit
108 DVD-ROM drive
109 NIC
110 Sound processing unit
111 Microphone
201 User management system
231 Management server device
251 Terminal device
271 Internet
291 Mail server device
293 Cellular phone
301 Terminal memory unit
302 Login report transmitting unit
303 Login response receiving unit
304 Extracting unit
305 Mail transmitting unit
306 Terminal updating unit
307 Mail editing unit
501 Server memory unit
502 Login report receiving unit
503 Acquiring unit
504 Login response transmitting unit
505 Server updating unit

BEST MODE FOR CARRYING OUT THE INVENTION

An embodiment of the present invention will be explained below. For ease of understanding, an embodiment of the present invention that uses an information processing device for games to realize the present invention will be explained. However, the embodiment described below is provided to give explanations, not to limit the scope of the present invention. Therefore, those skilled in the art can adopt embodiments in which some or all of the structural elements are replaced with respective equivalents, and it should be understood that such embodiments are also to be included within the scope of the present invention.

First Embodiment

FIG. 1 is an exemplary diagram showing a general configuration of a typical information processing device that functions as a terminal device or the like of the present invention by running a program. The explanation will be given with reference to this diagram.

The information processing device 100 includes a CPU (Central Processing Unit) 101, a ROM (Read Only Memory) 102, a RAM (Random Access Memory) 103, an interface 104, a controller 105, an external memory 106, an image processing unit 107, a DVD-ROM (Digital Versatile Disc ROM) drive 108, an NIC (Network Interface Card) 109, a sound processing unit 110, and a microphone 111.

When a DVD-ROM that stores a game program and data is loaded in the DVD-ROM drive 108 and the information processing device 100 is turned on, the program is run and a terminal device or the like of the present embodiment is thus realized.

The CPU 101 controls the entire operation of the information processing device 100, and is connected to each structural element to exchange control signals and data therewith. The CPU 101 can perform arithmetic operations, such as addition, subtraction, multiplication, and division, logical operations, such as logical addition, logical multiplication, and logical negation, and bit operations, such as bitwise OR, bitwise AND, bit inversion, bit shift, and bit rotation, using an ALU (Arithmetic Logic Unit) (not illustrated) to a register (not illustrated) which is an memory area that can be accessed at a high speed. Furthermore, the CPU 101 may by itself be configured to be able to perform saturate calculations, such as addition, subtraction, multiplication, and division, vector operations like trigonometric functions, to deal with multimedia processing, or may realize these operations with a coprocessor.

An IPL (Initial Program Loader), which is executed immediately after the power is turned on, is recorded in the ROM 102, and as executed, causes a program stored in a DVD-ROM to be read into the RAM 103 and executed by the CPU 101. Further, an operating system program and various data that are necessary for controlling the operation of the whole information processing device 100 are stored in the ROM 102.

The RAM 103 is a temporary memory for storing data and programs, and retains programs and data read out from a DVD-ROM and data necessary for game proceeding and chat communications. The CPU 101 has a variable area in the RAM 103, and performs such processes as performing operations by directly working the ALU on the value stored as the variable, or once storing the value stored in the RAM 103 in a register to perform calculations on the register and writing back the calculation result in the memory.

The controller 105 connected via the interface 104 receives an operation input given by a user for playing a game.

The external memory 106 detachably Connected via the interface 104 rewritably stores data representing a play status of a game or the like (e.g., past achievements), data representing a progress status of a game, log (record) data of chat communication in the case of network match-up game or the like. As needed, a user can record such data in the external memory 106 by giving an instruction input via the controller 105.

A DVD-ROM to be loaded in the DVD-ROM drive 108 records a program for realizing a game and image data and sound data that accompany the game. Under the control of the CPU 101, the DVD-ROM drive 108 performs a read-out process on the DVD-ROM loaded therein to read out a necessary program and data, which are to be temporarily stored on the RAM 103 or the like.

The image processing unit 107 processes data read out from a DVD-ROM by means of the CPU 101 and an image computation processor (not illustrated) possessed by the image processing unit 107, and records the processed data in a frame memory (not illustrated) possessed by the image processing unit 107. Image information recorded in the frame memory is converted into video signals at predetermined synchronization timings and output to a monitor (not illustrated) connected to the image processing unit 107. This enables various types of image display.

The image computation processor can perform, at a high speed, overlay calculation of two-dimensional images, transparency calculation like a blending, and various saturation calculations.

The image computation processor can also perform, at a high speed, rendering of polygon information arranged in a virtual three-dimensional space and affixed with various texture information by Z buffering to obtain a rendered image of the polygon arranged in the virtual three-dimensional space as viewed panoramically from a predetermined view position toward a predetermined direction of visual line.

Furthermore, the CPU 101 and the image computation processor can work together to depict a string of letters as a two-dimensional image in the frame memory or on a surface of a polygon in accordance with font information that defines the shape of the letters. The font information is recorded in the ROM 102, but exclusive font information recorded in a DVD-ROM may be used.

The NIC 109 connects the information processing device 100 to a computer communication network (not illustrated) like the Internet. The NIC 109 is constituted by a 10BASE-T/100BASE-T compatible product used for building a LAN (Local Area Network), an analog modem, an ISDN (Integrated Services Digital Network) modem, or an ADSL (Asymmetric Digital Subscriber Line) modem for connecting to the Internet via a telephone line, a cable modem for connecting to the Internet via a cable television line, or the like, and an interface (not illustrated) that intermediates between any of those and the CPU 101.

The information processing device 100 can connect via the NIC 109 to an SNTP server on the Internet and obtain current date and time information by acquiring information from the server. Alternatively, a management server device for various types of network games and SNSs may be configured to serve the same function as an SNTP server.

Upon once obtaining date and time information, the information processing device 100 may update a counter that, while the information processing device 100 is in operation, functions similarly to a real time clock in response to a timer interruption. Alternatively, when the information processing device 100 includes a real time clock, the information processing device 100 may correct the date and time information indicated by the real time clock. At this time, the information processing device 100 may ask a user whether or not to correct the date and time information. If the user is not to correct the built-in real time clock, the information processing device 100 may retain the difference between the information indicated by the real time clock and the information actually acquired from the server, and when date and time information is necessary, add the difference to the information obtained from the real time clock.

The sound processing unit 110 converts sound data read out from a DVD-ROM into an analog sound signal and outputs it from a speaker (not illustrated) connected thereto. Further, under the control of the CPU 101, the sound processing unit 110 generates a sound effect or music data that are to be played in the progress of a game, and outputs sounds corresponding to such data from the speaker.

When sound data recorded in a DVD-ROM is MIDI data, the sound processing unit 110 refers to sound source data held by the MIDI data to convert the MIDI data into PCM data. When sound data recorded in the DVD-ROM is compressed sound data in an ADPCM form, an Ogg Vorbis form, or the like, the sound processing unit 110 extracts the data and converts it into PCM data. The sound processing unit 110 performs D/A (Digital/Analog) conversion on the PCM data at timings corresponding to the sampling frequency of that data and outputs it to the speaker, thereby enabling sound output.

The microphone 111 may also be connected to the information processing device 100 via the interface 104. In this case, the information processing device 100 performs A/D conversion on an analog signal from the microphone 111 at an appropriate sampling frequency into a digital signal in a PCM format to enable the sound processing unit 110 to process the signal like mixing.

When the information processing device 100 is used as a KARAOKE device, sound data read out from a DVD-ROM or sound data acquired from the computer communication network via the NIC 109 is used as accompaniment data, sound data input from the microphone is used as vocal data, and the accompaniment data and the vocal data are mixed by the sound processing unit 110, and the mixed data is output from the speaker. Note that sound may be output from a headphone not illustrated) or earphone (not illustrated) instead of the speaker.

Furthermore, the information processing device 100 may use a large capacity external storage device like a hard disk drive and configure it to serve the same function as the ROM 102, the RAM 103, the external memory 106, a DVD-ROM loaded in the DVD-ROM drive 108, or the like.

An embodiment in which a keyboard that receives inputting of an edit instruction for character strings from the user, and a mouse receiving inputting of specification/selection instructions of various positions are connected to the information processing device 100 may be adopted. Moreover, a general-purpose computer may be used instead of the information processing device 100 of the embodiment.

The real time clock may appropriately update current date and time information even if the information processing device 100 itself is powered off, but depending on the configuration of a network communication game, the game does not progress correctly in some cases if there is a difference between the updated data and time information and time information managed by the user management system. Accordingly, when the present invention is applied, current date and time information is acquired from various servers connected via the NIC 109 when the game starts to adjust a time.

The information processing device 100 explained above is a so-called "video game device for consumer use", but any device can embody the present invention as long as it is capable of executing the same processes as those explained above. Accordingly, the present invention can be realized on various computing machines, such as cellular phones, portable game devices, KARAOKE devices, and ordinary business-use computers.

For example, a general computer has, like the information processing device 100 described above, a CPU, a RAM, a ROM, a DVD-ROM drive, an NIC, an image processing unit having a simpler function as that of the information processing device 100, and a hard disk drive as an external memory device, and is compatible with a flexible disk, a magneto-optical disk, a magnetic tape, and the like. Moreover, such a computer may use a keyboard and a mouse as, input devices instead of the controller 105.

A management server device is realized by a general computer, but a predetermined information processing device 100 in a group of the information processing devices 100 may be used as a server device. The information processing device 100 and a general computer have large differences in a speed and a capacity, but have similar principled configuration and function. Accordingly, in the following explanation, a general computer and the information processing device 100 are regarded as similar devices.

Figure 2:
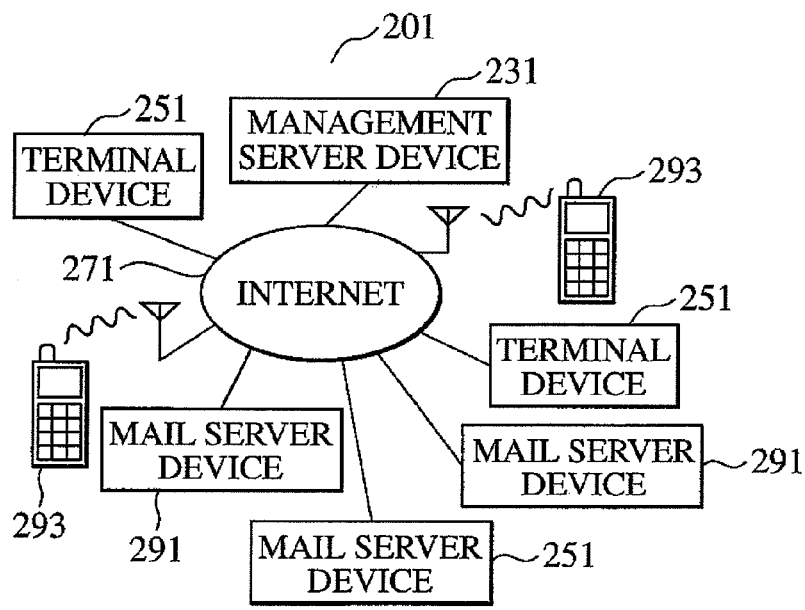
FIG. 2 is an exemplary diagram showing a general configuration of a user management system of an embodiment and that of a related device.

FIG. 2 is an exemplary diagram showing the configuration of a user management system of the embodiment and that of a related device. An explanation will be given with reference to this diagram.

As shown in the diagram, a management server device 231 and a plurality of terminal devices 251 all configuring a user management system 201 are connected together via the Internet 271 in a communicationable manner.

Electronic mails are exchanged among the terminal devices 251 through an external mail server device 291, and also exchanged among cellular phones 293 connected to the Internet 271.

In a network communication game, the management server device 231 is typically configured by a login server managing account information of each user and a lobby server introducing users one another, and a communication configuration that terminal devices 251 communicate with each other in a peer-to-peer fashion through the Internet 271 is widely adopted once the users recognize each other.

The same is true of an SNS, and a server which bears an editing operation of a diary of a user, an editing operation of a comment for that diary, and various browsing operations of the user corresponds to the login server and the lobby server. On the other hand, a peer-to-peer communication is utilized in a real time chatting or the like.

In network communication games or SNSs, as far as a system is being used, it is general that users are enabled to exchange messages with each other as a closed system, such as an "electronic mail" or a "bulletin board" is provided in the foregoing system. However, such exchanging of messages is not possible while the users are not using the system. Because the present invention is for prompting a user who is not using the system to use the system, an electronic mail system widely opened to the public is utilized, not utilizing transmission/reception of messages in such a closed system.

Figure 3:
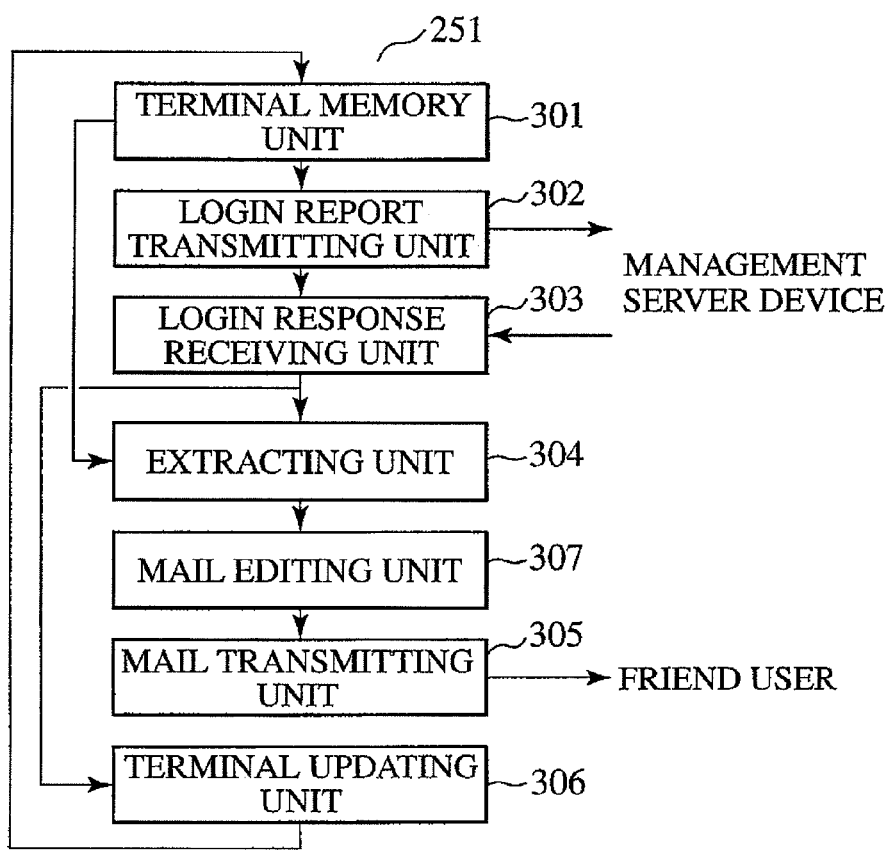
FIG. 3 is an exemplary diagram showing a general configuration of a terminal device according to the embodiment.

FIG. 3 is an exemplary diagram showing a general configuration of a terminal device according to the embodiment. An explanation will be given with reference to this diagram.

As shown in this diagram, the terminal device 251 includes a terminal memory unit 301, a login report transmitting unit 302, a login response receiving unit 303, an extracting unit 304, and a mail transmitting unit 305, and also a terminal updating unit 306 and a mail editing unit 207 both of which can be omitted.

First, the terminal memory unit 301 stores following information.

(1) A user name of a user who uses the terminal device 251 (hereinafter, "login user").

(2) A user name of a user and a mail address thereof who is a friend of the login user (hereinafter, "friend user"), and a final login time of the friend user.

(3) A host name of a mail server and an IP address thereof to be used when an electronic mail is transmitted, and other information necessary for use.

Information on the login user among those pieces of information is set with a service provider when a network communication game or an SNS is used.

In contrast, it is assumed that the mail address of the friend user is typically acquired through a direct chatting or the like without the management server 231 intervening when a peer-to-peer communication is established between the login user and the friend user.

When the terminal device 251 is realized by a game terminal, the foregoing (1) to (3) information are stored in the external memory 106 or the like which saves the status of a game. Moreover, when the terminal device 251 is realized by an ordinary computer, those pieces of information are stored in a hard disk drive or the like.

The user name of the friend user is information managed by the user management system 201, but the mail address of the friend user is directly supplied from the friend user, and typically not managed by the management server device 231.

The final login time of the friend user is notified from the management server device 231 appropriately as will be discussed later.

For example, in a chatting of a network communication game or the like, when a user wants to set another user to be a friend, a following process is executed.

That is, as an icon associated with the user ID of another user whom the user wants to set as a friend is selected, a menu is displayed on a display screen of the terminal device 251. As "invitation to be friend" is selected among the items in the menu, an inquiry to the effect that "you are invited to be a friend, accept?" is displayed on the display screen of the terminal device 251 of another user.

When another user selects "accept", a message to the effect that "please enter "your mail address" to be notified to a friend" is displayed on the terminal devices 251 of both users, and users are prompted to enter their respective mail addresses. A mail address on a cellular phone or the like is typically entered as the foregoing mail address in addition to a mail address available on the terminal device 251.

When both users enter their respective mail addresses, the terminal devices 251 exchange information on mail addresses associated with respective user names, and the terminal memory units 301 of respective terminal devices 251 of both users store the exchanged mail address in association with the user name of the user to be a friend.

It is easy if changing of the mail address of a user who once becomes a friend is realized through repeating of the foregoing process again with the friend user. This is desirable from the standpoint of clarifying that both users have a responsibility for management of personal information each other.

When deleting any user who has already become a friend among friend users, such deletion can be realized as the terminal device 251 displays a list of friend users stored in the terminal memory unit 301, the login user is prompted to select a friend user whom the login user wants to delete, and the user name of the specified friend user and the mail address thereof are deleted from the terminal memory unit 301.

Those processes are executed as the RAM 103, the NIC 109, the image processing unit 107, the controller 105, and the external memory 106 work together under the control of the CPU 101.

In the embodiment, a notification of prompting a user to log in is realized by means of an electronic mail, but it is desirable in some cases that such electronic mail utilizes any server other than the management server device 231 as a mail server from the standpoint of personal information protection and avoiding any increasing of the number of accesses. In order to cope with such a situation, the terminal device 251 is configured to be able to select an available mail server.

Accordingly, a case in which the host name of a mail server and the IP address thereof become necessary is a case in which the management server device 231 is not utilized as an SMTP (Send Mail Transfer Protocol) server for mails, and when a mail is transmitted through the management server device 231 in relay, such information become unnecessary.

Figure 4:
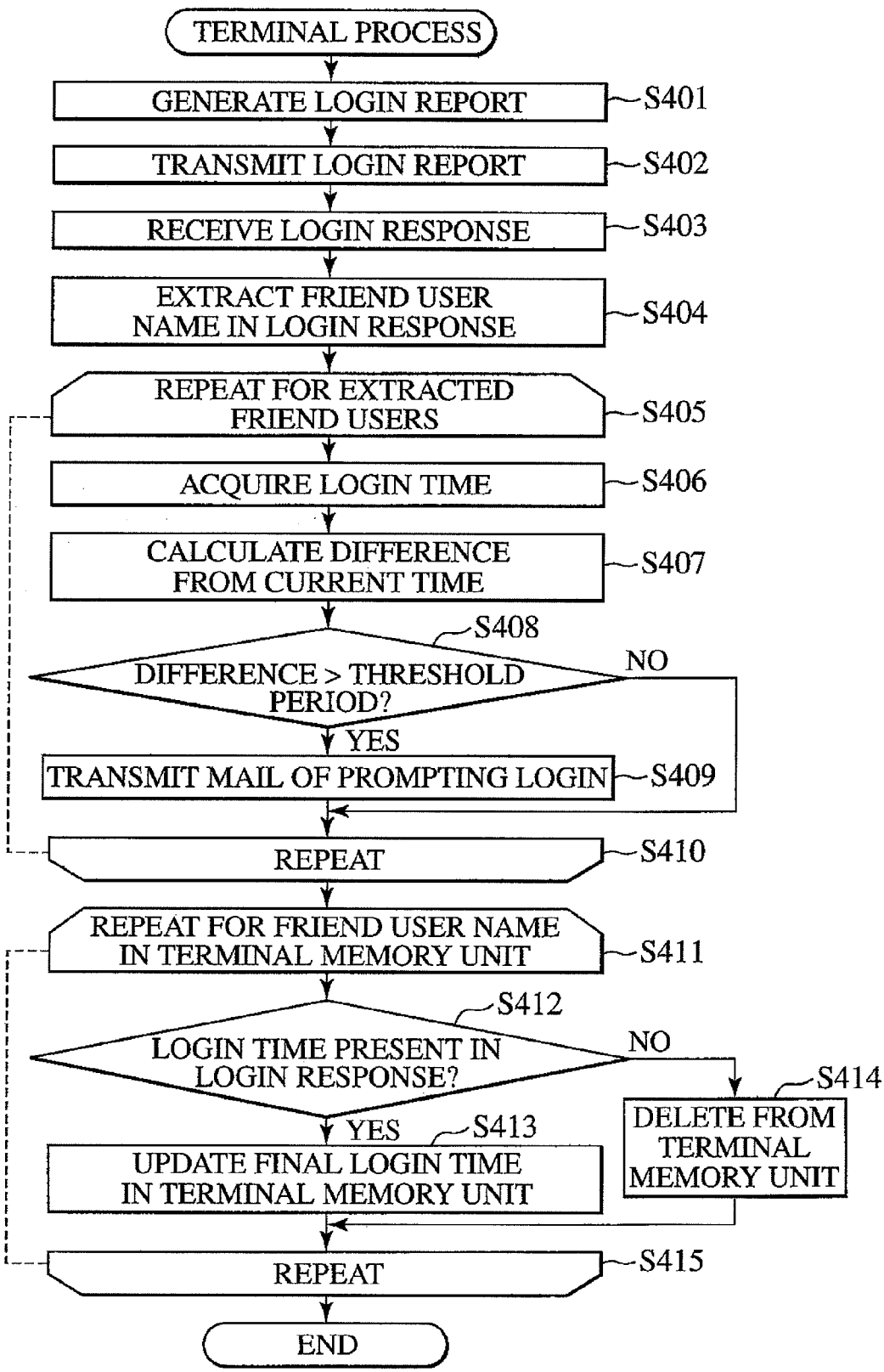
FIG. 4 is a flowchart showing a flow of a control for the terminal process executed by the terminal device of the embodiment.

In the embodiment, starting of a network communication game or an SNS at the terminal device 251 triggers execution of a terminal process at the terminal device 251. FIG. 4 is a flowchart showing a flow of a control in the terminal process. An explanation will be given with reference to this flowchart.

As the terminal process starts, the login report transmitting unit 302 generates packets of a login report which specifies the user name of the login user, and the user name of the friend user stored in the terminal memory unit 301 (step S401), and transmits the login report to the management server device 231 (step S402).

The login report specifies merely the user name managed by the management server device 231, and it is not necessary that personal information like a mail address is specified in the login report.

When a final login time is identified using a time measured by the terminal device 251, information on a current time is also contained in the packets of the login report when such packets are generated in the step S401.

In the management server device 231, a server process for processing the login report is executed.

Figure 5:
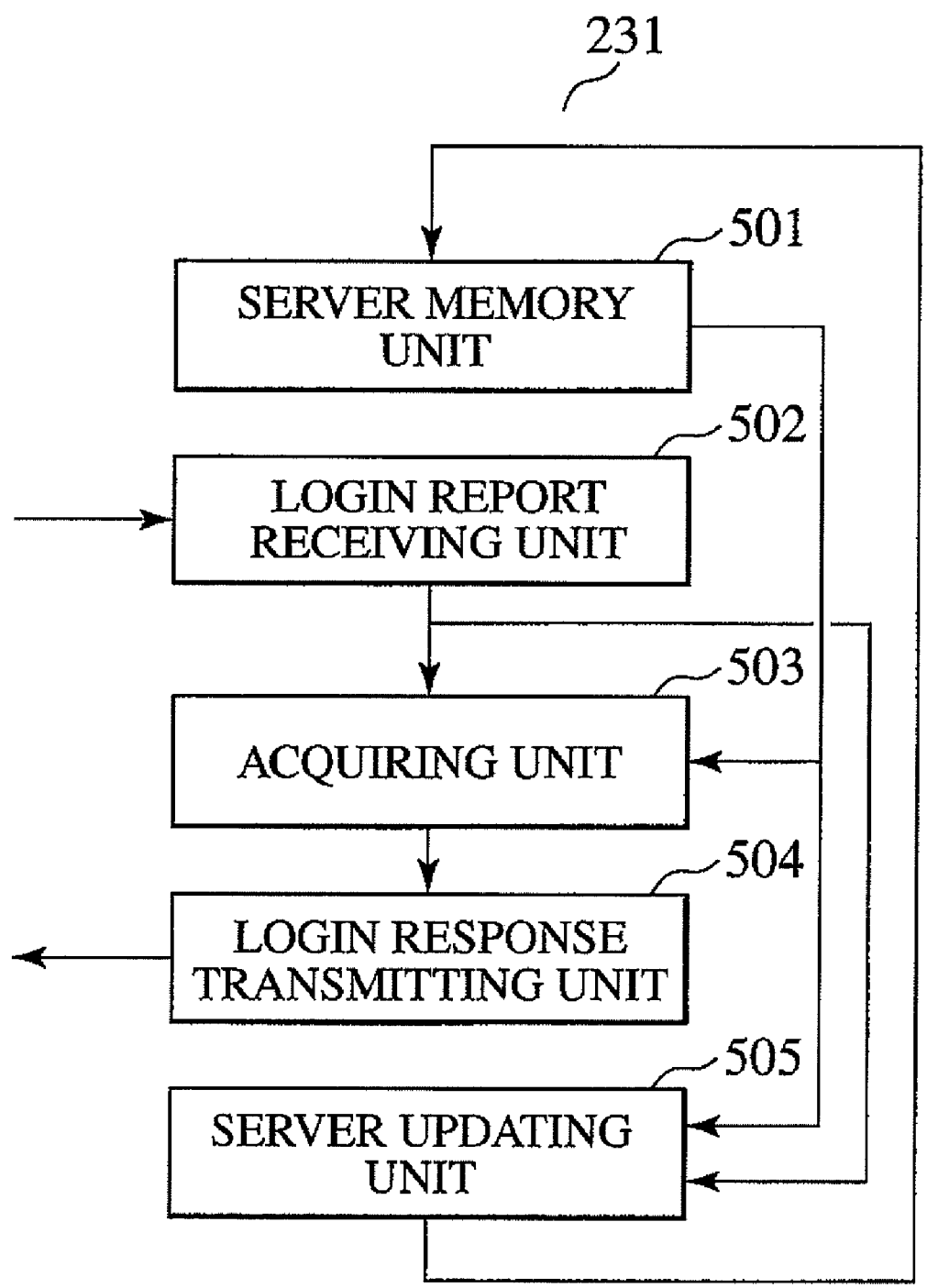
FIG. 5 is an exemplary diagram showing a general configuration of a management server of the embodiment.

FIG. 5 is an exemplary diagram showing a general configuration of the management server device 231 of the embodiment. An explanation will be given with reference to this diagram.

The management server device 231 includes a server memory unit 501, a login report receiving unit 502, an acquiring unit 503, a login response transmitting unit 504, and a sever updating unit 505.

The server memory unit 501 stores following pieces of information as a login report for each user name.

(1) A time when the user logged in at last. It can utilize a time when login information of the user transmitted from the terminal device 251 arrives the management server device 231, or a time measured by the terminal device 251 and contained in the packets of the login information.

(2) The user name of the friend user specified in the login information transmitted from the user at last. The friend user to a login user may change when a friendship changes, e.g., when a new user is invited to be a friend, or when a user is deleted from a friend list.

Those pieces of information may be stored as a whole directly in the form of the packets of the login report, or pieces of information specified in the login report may be appropriately sorted to enable acquisition of equivalent information to the packets of the login report.

It is typical that such information is registered in a database where only one record is registered with a user name being as a search key, but a user name may function as a search key, a login time may function as a sort key, and a "login report at the time of final login" may be acquired as a record indicated at the header.

Typically, the server memory unit 501 is realized by a hard disk drive connected to the information processing device 100.

FIG. 6 is a flowchart showing a flow of a control of a management process executed by the management server device 231. An explanation will be given with reference to this flowchart.

As the process starts, the login report receiving unit 502 of the management server device 231 monitors the NIC 109 whether or not packets of a login report has arrived (step S601). When it has not arrived (step S601: NO), other arbitrary server process is executed in a co-routine manner (step S602), and the process flow goes back to the step S601.

Conversely, when the login report has arrived (step S601: YES), the management server device 231 receives the login report (step S603), refers to the real time clock, and acquires a current time (step S604). Note that a current time is acquired in the step S604 when a "time when the login report arrives the management server device 231" is adopted as a login time, and when a "time when a process starts and which is measured at the terminal device 251" is adopted, a time specified in the login report is used instead.

Accordingly, the NIC 109 and the RAM 103 function as the login report receiving unit 502 under the control of the CPU 101.

Next, the acquiring unit 503 acquires the user name of a login user specified in a latest login report satisfying a predetermined friend condition relative to the received login report among the login reports stored in the server memory unit 501 and a login time stored in association with the login report (step S605).

Note that when one login report satisfying the predetermined friend condition relative to another login report is a case in which:

(1) the user name of a friend user specified in another login report is specified as the user name of a login user in the one login report; and (2) the user name of a login user specified in the one login report is specified as the user name of a friend user in another login report.

For example, it is supposed that there are four users A, B, C, and D as an example. Let us suppose that the user name of a friend user specified in each latest login report is as follow.

| | |
|---|---|
| Friend users specified in a login report of A | B and D |
| Friend users specified in a login report of B | A and C |
| Friend users specified in a login report of C | A, B, and D |
| Friend user specified in a login report of D | C |

For example, the friend user list in the login report of A includes B, and the friend user list in the login report of B includes A, so that respective login reports of A and B satisfy the friend condition each other. Therefore, A and B confirm that both users are friends with each other.

Moreover, the friend user list of the login report of A includes D, but the friend user list of the login report of D does not include A, so that A and D do not confirm that both users are friends with each other.

Likewise, A and C are not friends with each other, B and C are friends with each other, B and D are not friends with each other, and C and D are friends with each other.

As explained above, a login report specifies the user name of a friend user confirmed as a friend by a log in user. That is, as both conditions (1) and (2) are satisfied, a user name of a user who confirms that he/she is a friend with a login user who has transmitted a received login report is thus acquired.

Let us suppose that there are users who used to, be friends with each other but one user is no longer thinking that another user is a friend and another user is deleted from a friend list. In this case, both users do not currently confirm that both users are friends with each other.

As explained above, when a login report is managed by a database, those pieces of information can be obtained if the user name of a friend user of a login user is searched with the login user name of a received login report being as a search key, and then a login time is searched with the user name of the searched friend user being as a search key.

Accordingly, the hard disk drive and the RAM 103 work together to function as the acquiring unit 503 under the control of the CPU 101.

Furthermore, the login response transmitting unit 504 generates packets of a login response (step S606). The login response specifies the user name and the login time both acquired in the step S605 as the "user name of a friend user" and the "login time of the friend user", respectively.

The generated login response is transmitted to the terminal device 251 which has transmitted the received login report (step S607).

The final login time may be a sort of personal information, but it is configured that the final login times of respective friend users who confirm that they are friends with each other can be acquired at the terminal device 251 side based on an assumption that it is fine to let those users who confirm that they are friends with each other to know such information.

Accordingly, the RAM 103 and the NIC 109 work together to function as the login response transmitting unit 504 under the control of the CPU 101.

Next, the server updating unit 505 deletes, from the server memory unit 501, a login report specifying the user name of the same login user as that of the received login report among login reports stored in the server memory unit 501, and stores the received login report in the server memory unit 501 in association with a login time which is a current time acquired in the step S604, thereby updating information on the login user of the received login report stored in the server memory unit 501 (step S608). The process flow goes back to the step S601.

It is fine if a process progresses in such a way that only a latest login report specifying a specific user as a login user is stored in the server memory unit 501, so that a "delete" operation becomes adequate if it is configured that the acquiring unit 503 is unabled to acquire past data.

Accordingly, it is fine if past data is completely eliminated from the database, or if a "login report at a latest login time for each friend user satisfying the conditions (1) and (2)" is acquired as a search condition at the acquiring unit 503, the process at the server updating unit 505 becomes sufficient by merely registering the acquired current time in association with the received login report in a database.

In this fashion, the RAM 103 and the hard disk drive work together to function as the server updating unit 505 under the control of the CPU 101.

Returning to FIG. 4, the login response receiving unit 303 in the terminal device 251 receives a login response transmitted from the management server device 231 (step S403).

Accordingly, the RAM 103 and the NIC 109 work together to function as the login response receiving unit 303 under the control of the CPU 101.

As explained above, the login response specifies the final login time of a friend user who confirm that he/she is a friend with the user using the terminal device 251. Accordingly, the extracting unit 304 extracts the user name of the friend user specified in the received login response (step S404).

For each user name of the extracted friend user, a following process is repeated (step S405 to followings). That is, a login time specified in the login response associated with the user name of the friend user is acquired (step S406).

Next, a difference between a current time and the acquired login time is calculated (step S407). Note that the current time may be acquired by referring to the real time clock in the step S407, or may be acquired beforehand prior to the step S405.

It is determined whether or not that difference exceeds a predetermined threshold period (step S408). The predetermined threshold period is typically several times of a login interval desirable in a network communication game or an SNS, e.g., one to several weeks.

When the difference exceeds the predetermined threshold period (step S408: YES), the mail transmitting unit 305 transmits an electronic mail of prompting the friend user to log in to a mail address stored in the terminal memory unit 301 in association with the user name of the friend user (step S409), and the process flow progresses to the process for a next friend user (step S410).

The contents of the electronic mail may be a predetermined template itself, or the editing unit 307 may present templates of the electronic mail of prompting the friend user to log in to the login user, the login user may edit the electronic mail, and the mail transmitting unit 305 may transmit the edited electronic mail.

In the latter case, a message from the user may be specified in the login prompting mail, not just automatically transmitting a template of the stylized login prompting mail. A message created by the user reinforces the friendship with another friend, thereby prompting another user to log in.

Accordingly, the RAM 103 and the NIC 109 work together to function as the mail transmitting unit 305, and the image processing unit 107 and the controller 105 work together to function as the mail editing unit 307 under the control of the CPU 101.

Note that as an SMTP server for transmitting an electronic mail, the management server device 231 may be utilized as explained above, or, a setting may be enabled for each user and a device other than the management server device 231 may be utilized based on information stored in the terminal memory unit 301. In the latter case, from the standpoint of personal information protection and avoiding any increasing of the number of accesses, it becomes possible to cope with a situation in which a device other than the management server device 231 is desirable to use.

In addition, when an electronic mail of prompting a friend user to log in is transmitted, a transmission time may be stored in the terminal memory unit 301 in association with the user name of the friend user, and an electronic mail may be transmitted if "the difference>threshold period" and "the login time is a future time beyond the mail transmission time". This avoids redundant transmission of a large number of electronic mails to a friend user who has not logged in recently when the login user successively logs in, and this enables transmission of an electronic mail only at the first time of the successive login.

Conversely, when it does not exceed the predetermined threshold period (step S408: NO), the process flow goes to the step S410 to proceed to the process for a next extracted friend user.

Accordingly, the external memory 106, the RAM 103, and the hard disk drive work together to function as the extracting unit 304 under the control of the CPU 101.

As explained above, in the embodiment, the mail addresses stored in the terminal memory unit 301 are exchanged between users each other, and as the terminal device 251 directly (more specifically, through various mail servers (it is typical that a device other than the management server device 231 is selected, but the management server device 231 may be used) in relay) transmits a mail, linking between a user name and a mail address at the management server device 231 becomes unnecessary. Moreover, as the mail address itself is managed at the terminal device 251 side, it is preferable in many cases from the standpoint of management of personal information.

After the process from the step S405 to the step S410 is executed for all friend users extracted from received login responses, a following process is executed for all friend users stored in the terminal memory unit 301 (step S411 to step S415).

That is, it is determined whether or not a login time of a friend user is specified in a received login report (step S412).

When it is specified (step S412: YES), information in the terminal memory unit 301 is updated with the specified login time being as a final login time in association with the user name of the friend user (step S413), and the process progresses to the process for the next user (step S415). The final login time of each friend user is thus updated through this process.

Conversely, when it is not specified (step S412: NO), this means that a friendship has been broken, so that information on that friend user is deleted from the terminal memory unit 301 (step S414), the process flow goes to the step S415, and the process progresses to the process for the next user.

Again, the foregoing example case is reviewed. That is, it is assumed that the user name of a friend user specified in each latest login report is as follow.

| | |
|---|---|
| Friend users specified in the login report of A | B and D |
| Friend users specified in the login report of B | A and C |
| Friend users specified in the login report of C | A, B and D |
| Friend user specified in the login report of D | C |

Under the foregoing circumstance, let us suppose that A logs in while specifying B and D as friend users. Because A and B are friends with each other, A and C are not friends with each other (C is not contained in the login report of A), and A and D are not friends with each other (A is not contained in the login report of D), only the login time of B is specified in the login response.

Accordingly, in the step S413, the final login time of B in the terminal memory unit 301 of the terminal device 251 used by A is updated to the specified login time.

Moreover, at the terminal memory unit 301 of the terminal device 251 used by A, D was once stored as a friend user, but the login time of D is not specified in the login response. Non specification of the login time in the login report means that "both users no longer confirm that they are friends with each other", so that a mail address which is personal information of a user who is not a friend currently but used to be confirmed as a friend is deleted from the terminal memory unit 301. That is, information on D is deleted from the terminal memory unit 301 in the step S414.

At the time of deletion, information on the "user no longer confirmed as a friend" (in the foregoing case, user D) may be displayed on a screen, and the login user (in the foregoing case, use A) may be asked and assured whether or not to delete information on that user (user D).

When a friendship between the users is broken because of some reason, information stored in the terminal devices 251 can reflect this circumstance appropriately as the delete process is executed in the step S414, but this process can be skipped.

Accordingly, the CPU 101 works together with the RAM 103, the external memory 106, and the like to function as the terminal updating unit 306.

When repeating of step S411 to step S415 completes for all friend uses stored in the terminal memory 301, the terminal process is terminated, and a main process for a network communication game or an SNS is initiated.

In the foregoing embodiment, the final login time of a friend user is stored in the terminal memory unit 301. However, this process can be skipped and once it is determined whether or not to transmit an electronic mail with reference to the login time of a friend user specified in a login report, such information may be discarded.

Moreover, as information of a friend user is edited or a menu item prepared for checking a status is executed, the user name of the friend user, the mail address thereof, and a final login time may be displayed on a screen.

As explained above, according to the embodiment, a notification of prompting a user to log in is automatically performed through a mail address which is not directly managed by the user management system 201, so that the user is attracted to a network communication game or an SNS utilizing the user management system 201, while at the same time, management of a mail address is entrusted to each user, so that there is an advantage for protection of personal information.

This application claims the benefit of a priority based on Japanese Patent Application No 2007-272756 filed on Oct. 19, 2007, the entire contents of which are incorporated herein by reference as far as it is permitted in designated countries.

INDUSTRIAL APPLICABILITY

As explained above, according to the present invention, there are provided a user management system and a user management method which are appropriate for properly transmitting a notification of prompting a user who has not been logging in a network communication game, an SNS (Social Network Service) or the like for a long time to log in, a computer-readable information recording medium recording a program which allows a management server and a plurality of terminal devices to realize such a system and a method, and the program.

The invention claimed is:

1. A user management system comprising:
a management server device; and,
a plurality of terminal devices, wherein (a) each of the plurality of terminal devices includes:
a terminal memory unit which stores a user name of a login user using a local terminal device, and which stores a user name of a friend user who is a friend of the login user and a mail address of the friend user in association with each other; and
a login report transmitting unit which transmits a login report, specifying the user name of the login user and the user name of the friend user stored in the terminal memory unit, to the management server device, wherein
(b) the management server device includes:
a login report receiving unit which receives the login reports transmitted from each of the plurality of terminal devices;

a server memory unit which stores each of the received login reports in association with a login time;

an acquiring unit which selects one of the stored login reports which is associated with a latest login time for each login user name specified in each login report stored in the server memory unit, and which acquires a user name of a login user specified in, among the selected login reports, a login report satisfying a predetermined friend condition relative to the received login report together with a login time stored in association with that login report;

a login response transmitting unit which transmits a login response, specifying the acquired user name and login time as a user name of a friend user and a login time of the friend user, respectively, to the terminal device which has transmitted the received login report; and a server updating unit which stores the received login report in the server memory unit in association with a login time which is a current time, wherein (c) each of the plurality of terminal devices further includes:

a login response receiving unit which receives the login response transmitted from the management server device;

an extracting unit which extracts, among user names of friend users specified in the received login response, a user name of a friend user, having a difference between a current time and a login time of the friend user specified in the received login response, the difference exceeding a predetermined threshold period; and a mail transmitting unit which transmits an electronic mail prompting the friend user to log in to a mail address stored in the terminal memory unit in association with the user name of the extracted friend user, and wherein a condition that one login report satisfying a predetermined friend condition relative to another login report is a case in which:

(1) a user name of a friend user specified in another login report is specified as a user name of a login user in the one login report; and (2) a user name of a login user specified in another login report is specified as a user name of a friend user in the one login report.

2. The user management system according to claim 1, wherein each of the plurality of terminal devices further includes:

a terminal updating unit which deletes a user name of a friend user having no login time specified in the received login response and a mail address of the friend user from the terminal memory unit.

3. The user management system according to claim 2, wherein each of the plurality of terminal devices is configured that:

the terminal memory unit stores a user name of a friend user in association with a final login time of the friend user; and the terminal updating unit updates a final login time stored in the terminal memory unit in association with a user name of a friend user specified in the received login response with a login time specified in the received login response.

4. The user management system according to claim 1, wherein each of the plurality of terminal devices further includes a mail editing unit which presents a template of an electronic mail of prompting a user to log in to the login user, and allows the login user to edit the electronic mail, and wherein the mail transmitting unit transmits an edited electronic mail.

5. The user management system according to claim 1, wherein each of the plurality of terminal devices is configured that:

the terminal memory unit further stores a mail server name to be used by the login user; and the mail transmitting unit transmits an electronic mail via a mail server with the stored mail server name.

6. A user management method executed by a management server device and a plurality of terminal devices, wherein the management server device comprises a server memory unit, a login report receiving unit, an acquiring unit, a login response transmitting unit, and a server updating unit, and each of the plurality of terminal devices comprises a terminal memory unit, a login report transmitting unit, a login response receiving unit, an extracting unit, and a mail transmitting unit, and wherein (a) each of the plurality of terminal devices stores a user name of a login user using the local terminal device in the terminal memory unit, and also stores a user name of a friend user, who is a friend of the login user, in the terminal memory unit in association with a mail address, and the user management method includes the steps of:

a login report transmitting step of causing the login report transmitting unit to transmit a login report specifying a user name of the login user and a user name of a friend user stored in the terminal memory unit to the management server device, wherein (b) the management server device stores each of the received login reports in the server memory unit in association with a login time;

a login report receiving step of causing the login report receiving unit to receive the login reports transmitted from each of the plurality of terminal devices;

an acquiring step of causing the acquiring unit to select one of the login reports which is associated with a latest login time for each login user name specified in each login report stored in the server memory unit, and to acquire a user name of a login user specified in, among the selected login reports, a login report satisfying a predetermined friend condition relative to the received login report together with a login time stored in association with that login report;

a login response transmitting step of causing the login response transmitting unit to transmit a login response, specifying the acquired user name and login time as a user name of a friend user and a login time of the friend user, respectively, to the terminal device which has transmitted the received login report; and a server updating step of causing the server updating unit to store the received login report in the server memory unit in association with a login time which is a current time, wherein (c) at each of the plurality of terminal devices, the user management method further includes the steps of:

a login response receiving step of causing the login response receiving unit to receive the login response transmitted from the management server device;

an extracting step of causing the extracting unit to extract, among user names of friend users specified in the received login response, a user name of a friend user, having a difference between a current time and a login time of the friend user specified in the received login response, the difference exceeding a predetermined threshold period; and a mail transmitting step of causing the mail transmitting unit to transmit an electronic mail prompting the friend user to log in to a mail address stored in the terminal memory unit in association with the user name of the extracted friend user, and wherein a condition that one login report satisfying a predetermined friend condition relative to another login report is a case in which:
(1) a user name of a friend user specified in another login report is specified as a user name of a login user in the one login report; and
(2) a user name of a login user specified in another login report is specified as a user name of a friend user in the one login report.

7. A non-transitory computer-readable information recording medium storing a user management program including a management server device program for allowing a computer for a management server device to function as the management server device and also a terminal device program for allowing a plurality of computers to function as computer for each of a plurality of terminal devices, wherein
(a) the terminal device program allows each of the plurality of terminal device computers to function as:
a terminal memory unit which stores a user name of a login user using a local terminal device, and which stores a user name of a friend user, who is a friend of the login user, and a mail address of the friend user in association with each other; and
a login report transmitting unit which transmits a login report, specifying the user name of the login user and the user name of the friend user stored in the terminal memory unit, to the management server device,
(b) the management server device program allows the management server device computer to function as:
a login report receiving unit which receives the login reports transmitted from each of the plurality of terminal devices;
a server memory unit which stores each of the received a login reports in association with a login time;
an acquiring unit which selects one of the received login reports which is associated with a latest login time for each login user name specified in each login report stored in the server memory unit, and which acquires a user name of a login user specified in, among the selected login reports, a login report satisfying a predetermined friend condition relative to the received login report together with a login time stored in association with that login report;
a login response transmitting unit which transmits a login response, specifying the acquired user name and login time as a user name of a friend user and a login time of the friend user, respectively, to the terminal device which has transmitted the received login report; and
a server updating unit which stores the received login report in the server memory unit in association with a login time which is a current time,
(c) the terminal device program allows each of the plurality of terminal device computers to further function as:
a login response receiving unit which receives the login response transmitted from the management server device;
an extracting unit which extracts, among user names of friend users specified in the received login response, a user name of a friend user, having a difference between a current time and a login time of the friend user specified in the received login response, the difference exceeding a predetermined threshold period; and
a mail transmitting unit which transmits an electronic mail of prompting the friend user to log in to a mail address stored in the terminal memory unit in association with the user name of the extracted friend user, and wherein a condition that one login report satisfying a predetermined friend condition relative to another login report is a case in which:
(1) a user name of a friend user specified in another login report is specified as a user name of a login user in the one login report; and
(2) a user name of a login user specified in another login report is specified as a user name of a friend user in the one login report.

8. A user management program including a management server device program stored on a non-transitory computer-readable medium for allowing a computer for a management server device to function as the management server device and a terminal device program for allowing a plurality of computers to function as a plurality of terminal devices
wherein (a) the terminal device program allows each of the plurality of terminal device computers to function as:
a terminal memory unit which stores a user name of a login user using a local terminal device, and which stores a user name of a friend user, who is a friend of the login user and a mail address of the friend user in association with each other; and
a login report transmitting unit which transmits a login report, specifying the user name of the login user and the user name of the friend user stored in the terminal memory unit, to the management server device,
(b) the management server device program allows the management server device computer to function as:
a login report receiving unit which receives the login reports transmitted from each of the plurality of terminal devices;
a server memory unit which stores each of the received login reports in association with a login time;
an acquiring unit which selects one of the stored login reports which is associated with a latest login time for each login user name specified in each login report stored in the server memory unit, and which acquires a user name of a login user specified in, among the selected login reports, a login report satisfying a predetermined friend condition relative to the received login report together with a login time stored in association with that login report;
a login response transmitting unit which transmits a login response, specifying the acquired user name and login time as a user name of a friend user and a login time of the friend user, respectively, to the terminal device which has transmitted the received login report; and
a server updating unit which stores the received login report in the server memory unit in association with a login time which is a current time,
(c) the terminal device program allows each of the plurality of terminal device computers to further function as:
a login response receiving unit which receives a login response transmitted from the management server device;
an extracting unit which extracts, among user names of friend users specified in the received login response, a user name of a friend user, having a difference between a current time and a login time of the friend user specified in the received login response, the difference exceeding a predetermined threshold period; and
a mail transmitting unit which transmits an electronic mail of prompting the friend user to log in to a mail address stored in the terminal memory unit in association with the user name of the extracted friend user, and wherein a condition that one login report satisfying a predetermined friend condition relative to another login report is a case in which:
(1) a user name of a friend user specified in another login report is specified as a user name of a login user in the one login report; and (2) a user name of a login user specified in another login report is specified as a user name of a friend user in the one login report.

* * * * *

UNITED STATES PATENT AND TRADEMARK OFFICE
CERTIFICATE OF CORRECTION

PATENT NO. : 8,365,251 B2
APPLICATION NO. : 12/738241
DATED : January 29, 2013
INVENTOR(S) : Takeshi Yamaguchi It is certified that error appears in the above-identified patent and that said Letters Patent is hereby corrected as shown below:

IN THE CLAIMS:

Column 22, in claim 8, line 15: Please add a -- , -- after the word devices

Signed and Sealed this
Ninth Day of April, 2013

Teresa Stanek Rea
*Acting Director of the United States Patent and Trademark Office*